(12) United States Patent
Denning

(10) Patent No.: US 8,230,567 B2  
(45) Date of Patent: Jul. 31, 2012

(54) TIE DOWN STRAP ROLLUP DEVICE

(76) Inventor: Eddie C. Denning, Alice, TX (US)

( * ) Notice: Subject to any disclaimer, the term of this patent is extended or adjusted under 35 U.S.C. 154(b) by 99 days.

(21) Appl. No.: 12/917,619

(22) Filed: Nov. 2, 2010

(65) Prior Publication Data

US 2011/0101144 A1 May 5, 2011

Related U.S. Application Data

(60) Provisional application No. 61/257,348, filed on Nov. 2, 2009.

(51) Int. Cl.  
*B25B 11/00* (2006.01)

(52) U.S. Cl. ......... 29/271; 29/243; 29/263; 81/121.1; 81/119; 242/390

(58) Field of Classification Search .......... 29/271, 29/243, 263, 270, 280, 278; 269/3, 6, 95; 81/121.1, 119, 120; 242/390, 398  
See application file for complete search history.

(56) References Cited

U.S. PATENT DOCUMENTS

| | | | | |
|---|---|---|---|---|
| 5,802,692 | A * | 9/1998 | Philippe | 29/263 |
| 5,996,447 | A * | 12/1999 | Bayouth | 81/176.2 |
| 6,363,596 | B1 * | 4/2002 | Reiter et al. | 29/278 |
| 7,496,999 | B2 * | 3/2009 | Robarge | 29/265 |
| 7,658,368 | B2 * | 2/2010 | Laun | 254/18 |
| 7,832,071 | B2 * | 11/2010 | Klann | 29/214 |
| 7,895,723 | B2 * | 3/2011 | Wridt et al. | 29/257 |
| 7,918,003 | B2 * | 4/2011 | Acciardo, Jr. | 29/263 |
| 7,963,012 | B1 * | 6/2011 | Brasher et al. | 29/270 |
| 7,980,604 | B2 * | 7/2011 | Punaro | 292/258 |
| 7,987,571 | B2 * | 8/2011 | English | 29/264 |
| 8,146,223 | B2 * | 4/2012 | Ebert | 29/281.1 |
| 2010/0050822 | A1 * | 3/2010 | Wilson et al. | 81/121.1 |
| 2011/0101144 | A1 * | 5/2011 | Denning | 242/390 |

* cited by examiner

Primary Examiner — Lee D Wilson

(57) ABSTRACT

A rollup device can save users time and energy on the side of the road when rolling up belts or tie down straps which secure a load on a flatbed trailer. The rollup device may be a piece of metal having a fitting centrally located therewithin. The piece of metal may fit into a roll-up on the side of the flatbed trailer. A drill, such as a 12V cordless drill, may be used to turn the rollup device by fitting a drill bit into the centrally located fitting. Powering the drill may turn the roll-up device and, therefore, roll up the belts or straps.

8 Claims, 3 Drawing Sheets

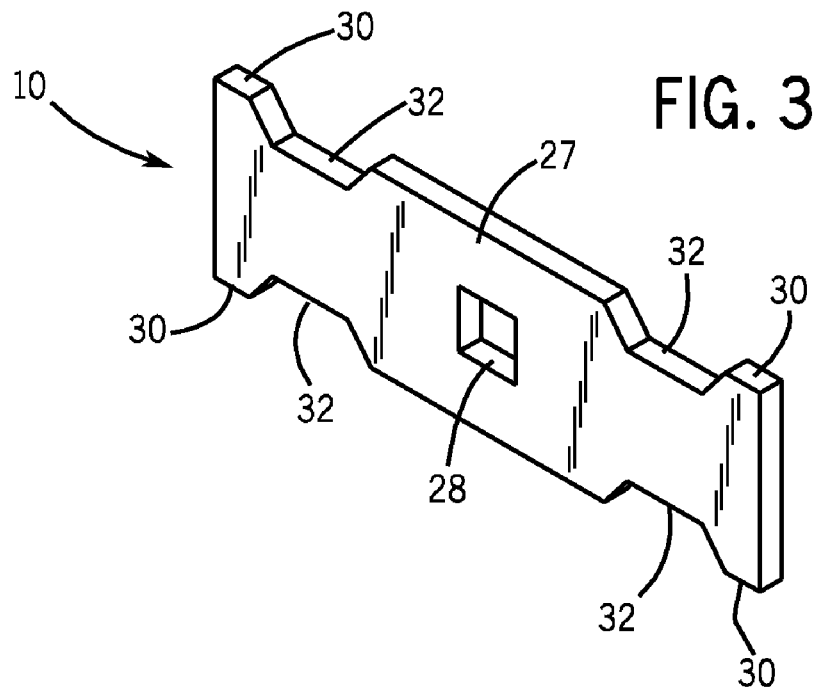
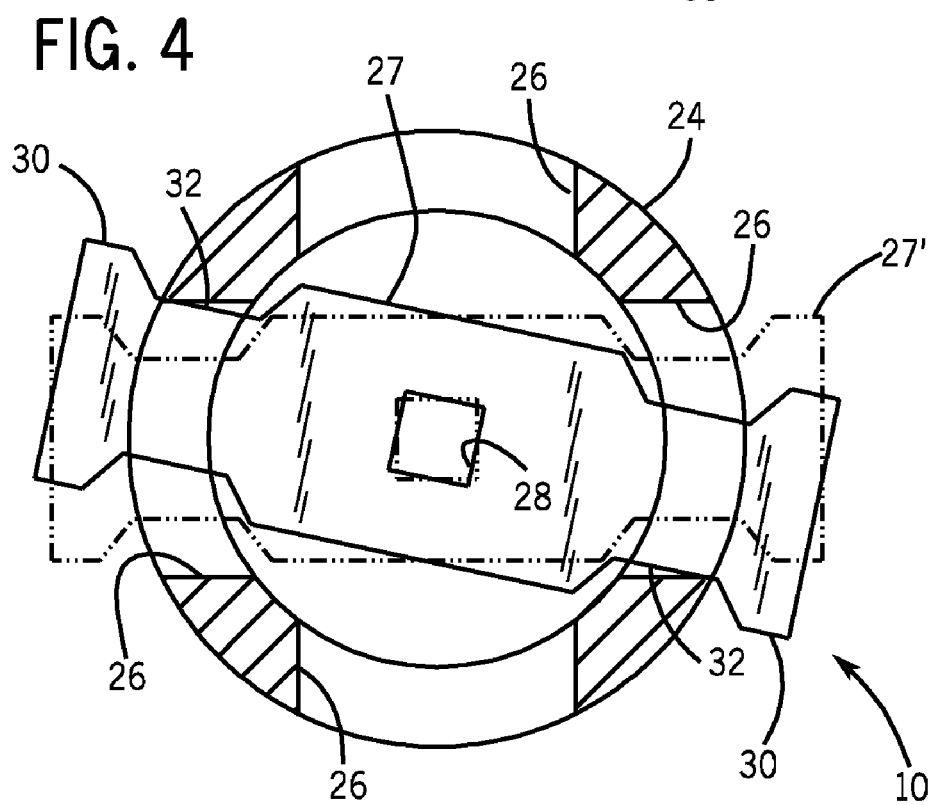

TIE DOWN STRAP ROLLUP DEVICE

CROSS-REFERENCE TO RELATED APPLICATIONS

This application claims the benefit of priority to U.S. Provisional patent application No. 61/257,348, filed Nov. 2, 2009, which is herein incorporated by reference.

BACKGROUND OF THE INVENTION

The present invention relates to the field of tools and, more particularly, to a tool for turning a rollup device such as a tie down strap rollup device.

Flat bed trailer trucks often use tie down straps for holding cargo on the truck bed. Tie down straps are typically extended from a reel, secured about the cargo, and tightened down with a hand tool. When the cargo is unloaded, the tie down straps are wrapped around the reel for storage with the same hand tool. Hand reeling of the straps takes time and energy for the driver.

As can be seen, there is a need for a tool for rolling up tie down straps or belts on a reel.

SUMMARY OF THE INVENTION

In one aspect of the present invention, a tool comprises a metal plate adapted to extend between holes in a hub of a winch assembly; and a fitting centrally disposed in the metal plate.

In another aspect of the present invention, a winch assembly comprises a drum having a tie down wound thereupon; a hub attached to the drum, the hub having at least two holes therein; a plate extending between the holes in the hub; and a fitting centrally disposed in the plate.

These and other features, aspects and advantages of the present invention will become better understood with reference to the following drawings, description and claims.

BRIEF DESCRIPTION OF THE DRAWINGS

FIG. 3 is a perspective view of the rollup device of FIG. 1;

FIG. 4 is a cross-sectional view taken along line 4-4 of FIG. 2;

DETAILED DESCRIPTION OF THE INVENTION

Figure 1:
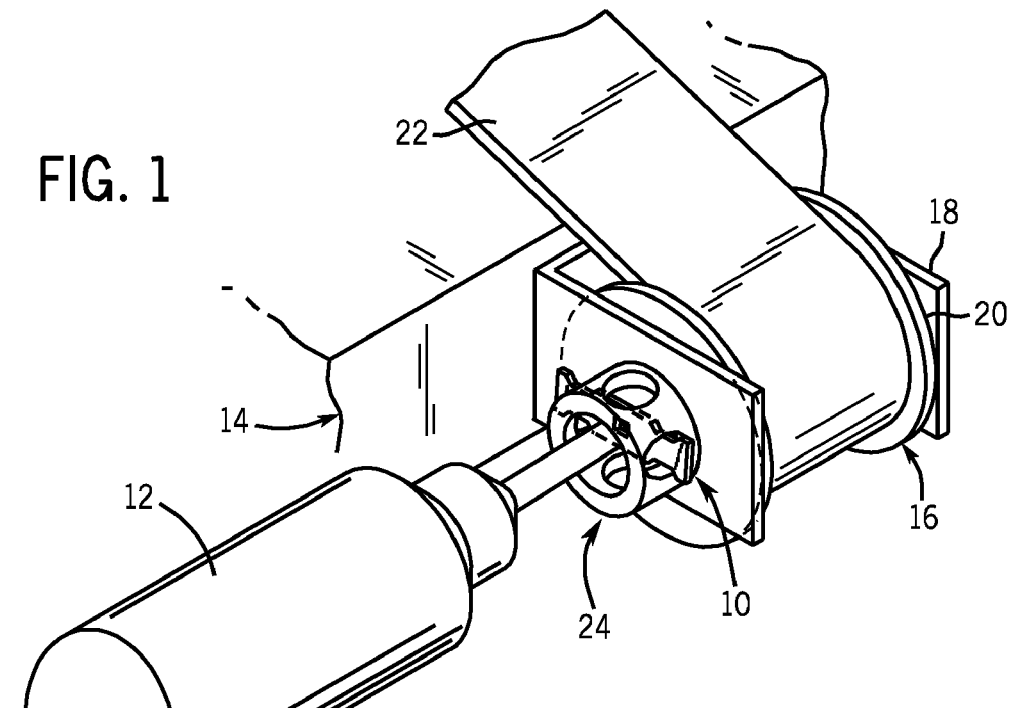
FIG. 1 is a perspective view of a rollup device according to the present invention, in use.
Figure 2:
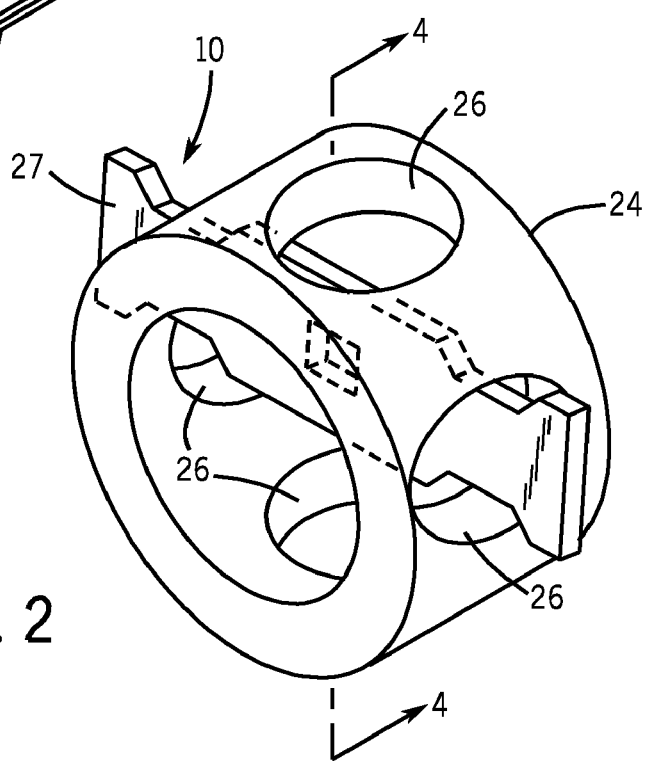
FIG. 2 is a detailed perspective view of the rollup device of FIG. 1.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Broadly, an embodiment of the present invention provides a rollup device that can save users time and energy on the side of the road when rolling up belts or tie down straps which secure a load on a flatbed trailer. The rollup device may be a piece of metal having a fitting centrally located therewithin. The piece of metal may fit into a roll-up on the side of the flatbed trailer. A drill, such as a 12V cordless drill, may be used to turn the rollup device by fitting a drill bit into the centrally located fitting. Powering the drill may turn the roll-up device and, therefore, roll up the belts or straps.

Referring to FIGS. 1 through 4, a flatbed trailer 14 may include a ratcheting winch assembly 16 containing a tie down 22. The winch assembly 16 may connect to the flatbed trailer 14 via a frame 18. The tie down 22 may be stored around a drum 20 of the winch assembly 16. The drum 20 may rotate within the frame 18.

A hub 24 of the winch assembly 16 may extend outside of the frame 18. Rotation of the hub 24 may affect rotation of the drum 20 of the winch assembly 16. The hub 24 may include a plurality of holes 24 formed in an outer circumferential surface of the hub 24. In some embodiments, four holes, spaced about 90 degrees apart from each other, may be disposed in the hub 24.

A rollup device 10 may be a flat plate 27 of metal having a fitting 28, such as a hole, formed centrally therewithin. End tabs 30 may be present on top and bottom sides at opposing ends of the plate 27 (four tabs 30 may be present). Notches 32 may be formed in the plate 27 on top and bottom sides at opposing ends of the plate 27, adjacent to the tabs 30. The notches 32 may align with the holes 26 in the hub 24, as shown in FIG. 4. When the rollup device 10 is used, the notches 32 may prevent the plate 27 from slipping out of the hub 24.

To use the rollup device 10, as shown in FIG. 1, a drill 12 may have a bit that has an end adapted to fit into the fitting 28 of the plate 27. When the drill is powered, the drill bit may turn the plate 27, thus turning the hub 24, and, in turn, turning the drum 20 to roll up the tie down 22.

In some embodiments, the fitting 28 may be a hole of ⅜ inch, thereby permitting fitting a typical ⅜ inch socket drill bit. The plate 27 may be from about 2 to about 3 inches in length, typically about 2.5 inches in length, from about 0.5 to about 1 inch in width, typically about ¾ inch in width, and from about 1/16 to about ⅜ inch in thickness, typically about ⅛ inch in thickness.

Figure 5:
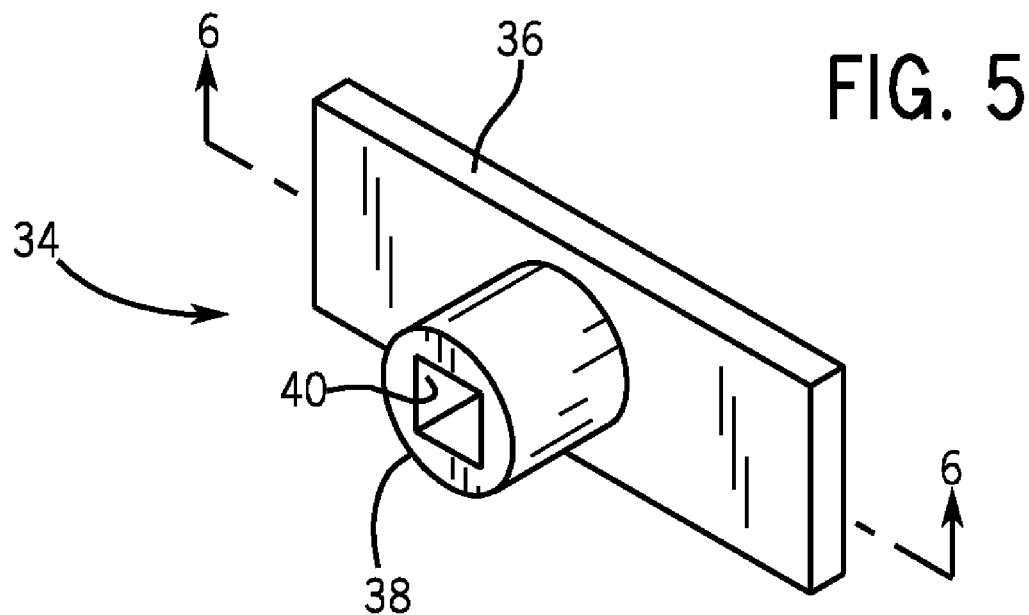
FIG. 5 is a perspective view of a rollup device according to an alternate embodiment of the present invention.
Figure 6:
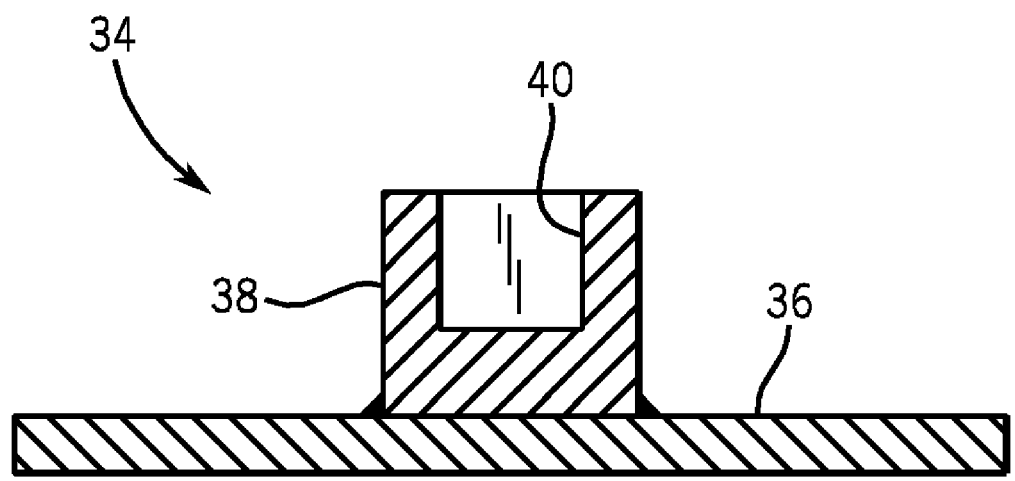
FIG. 6 is a cross-sectional view taken along line 6-6 of FIG. 5.

Referring to FIGS. 5 and 6, an alternate embodiment of a rollup device 34 may include a plate 36 having a socket 38 attached thereto. The socket 38 may be, for example, a ⅜ inch drive, ½ inch socket. The ⅜ inch drive 40 may be turned similarly to the above described embodiment, with, for example, a cordless drill.

While the above embodiments describe a flat plate (such as plate 27 and plate 36), other shapes for the plate may be utilized in the present invention. For example, the plate may have an elongated S-shape, where the ends of the S-shaped plate would, when in use, extend through the holes 26 of the hub 24.

While the above embodiments describe a tool for flatbed trailers, the present invention may have application in other situations. For example, the present invention may be used to roll up fire hoses on trucks. The size of the rollup device 10 may be adjusted to fit the requirements of the specific hub 24 and winch assembly 16.

It should be understood, of course, that the foregoing relates to exemplary embodiments of the invention and that modifications may be made without departing from the spirit and scope of the invention as set forth in the following claims.

What is claimed is:

1. A tool comprising:

a plate including a plurality notches adapted to extend between holes in a hub which has a cylindrical hollow shape with interior and exterior surfaces wherein said surfaces have a plurality of said holes being enclosed in said surfaces of said hub; and a square fitting centrally disposed in the plate.

2. The tool of claim 1, wherein the square fitting is a through hole.

3. The tool of claim 1, wherein the square fitting is a socket attached to the metal plate.

4. The tool of claim 1, wherein the square fitting includes a square hole having a width of 3/8 inch.

5. The tool of claim 1, wherein the plate includes tabs which are proximal to said notches with said tabs located on ends of said plate.

6. The tool of claim 1, wherein the plate includes a plurality of at least four tabs which are proximal to said notches with said at least four tabs located on ends of said plate top and bottom positions.

7. The tool of claim 1, wherein the hub includes at least two enclosed holes.

8. The tool of claim 1, wherein the hub includes at least four enclosed holes.

* * * * *